March 26, 1940.　　　J. E. SEBESI　　　2,194,725
MOTOR VEHICLE IDENTIFICATION PLATE
Filed May 24, 1939

John E. Sebesi
INVENTOR.
BY C. A. Snowles
ATTORNEYS.

Patented Mar. 26, 1940

2,194,725

UNITED STATES PATENT OFFICE 2,194,725

MOTOR VEHICLE IDENTIFICATION PLATE

John E. Sebesi, Phoenixville, Pa.

Application May 24, 1939, Serial No. 275,537

3 Claims. (Cl. 116—32)

This invention relates to motor vehicle identification means, the primary object of the invention being to provide identification plates adapted to be mounted on the bumpers of motor vehicles in such a way that the plates will become readily displaced and fall to the ground, should the bumper on which the plates are mounted, strike a person or stationary object, thereby leaving conclusive identification evidence at the scene of the accident, as to the owner of the vehicle or vehicles involved in the accident.

Another object of the invention is to provide a device of this character which may be readily and easily mounted on the bumpers of a vehicle, and one which will not detract from the lines of the car.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing.

Figure 1:
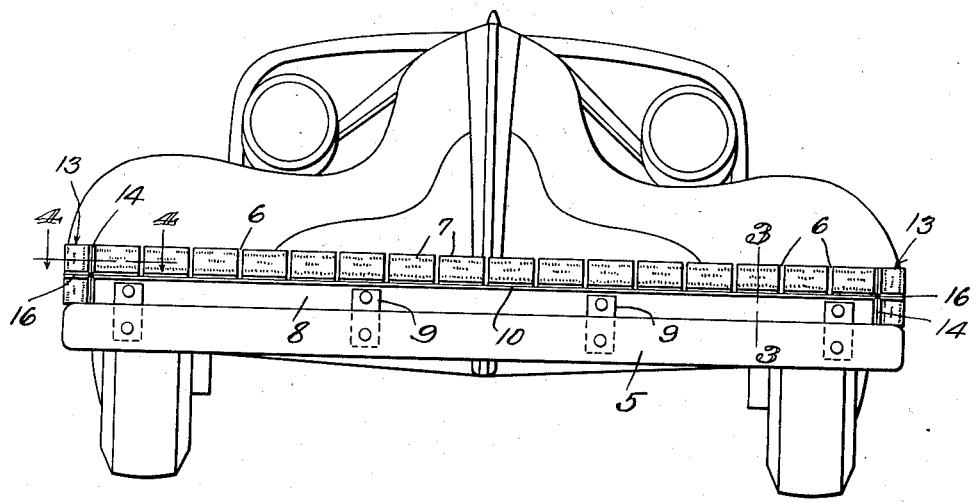
Figure 1 is an elevational view of a motor vehicle bumper equipped with identification plates, constructed in accordance with the invention.
Figure 2:
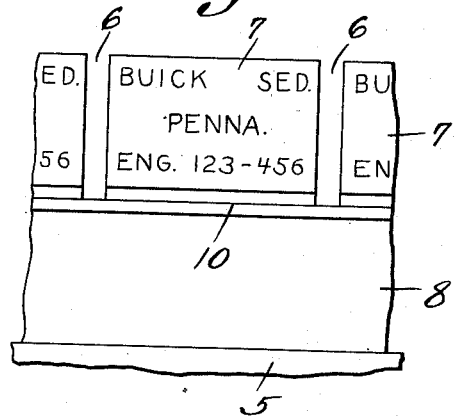
Figure 2 is an enlarged fragmental view of the device.
Figure 3:
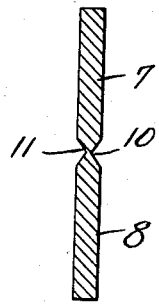
Figure 3 is a sectional view taken on line 3—3 of Figure 1.
Figure 4:
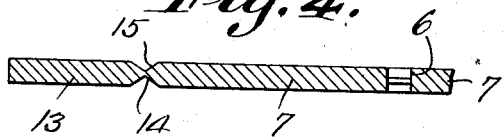
Figure 4 is a sectional view taken on line 4—4 of Figure 1.

Referring to the drawing in detail, the reference character 5 designates the bumper of a motor vehicle to which the identification plates, forming the subject matter of the present invention, are secured.

The device comprises a length of light cast metal material formed with a plurality of spaced vertical slots 6, dividing a portion of the length of material into a plurality of identification plates 7. The length of material directly under the plates, and which is indicated by the reference character 8, constitutes the support or body portion of the device, the support being secured to the bumper 5, by means of the angle irons 9 which are bolted or otherwise secured to the body portion 8 and bumper 5, as clearly shown by Figure 1 of the drawing.

Grooves 10 and 11 are formed in the outer and inner surfaces of the plates 7, at the bases of the plates, so that they will readily become broken or displaced from the body portion 8, when the plates contact with a person, or a stationary object, with sufficient force to injure the person or damage the stationary object.

The ends of the body portion carrying the plates, extend to points adjacent to the ends of the bumper, as clearly shown by the drawing.

The plates 13 formed at the ends of the body portion, are separated from the adjacent plates, and body portion 8, by vertical grooves 14 and 15 arranged in the outer and inner surfaces thereof. A horizontal groove 16 is formed between the upper and lower identification plates at the ends of the device, so that the plates at the ends of the device will become disconnected from the body portion should the motor vehicle carrying the plates side swipe a car, in passing.

It will of course be understood that each of the identification plates will carry indicia disclosing the name of the car, state and engine number, so that the owner of the vehicle carrying the plates, may be readily determined.

While I have shown and described the device as positioned on the front bumper of a motor vehicle, it is to be understood that the identification plates may be positioned in any desired place where necessary.

From the foregoing it will be seen that due to the construction of the device, a person driving the vehicle to hit a pedestrian or a stationary object, may be identified readily, since the plates will become disconnected from the body portion or bumper under the impact of the blow, leaving conclusive evidence as to the ownership of the vehicles involved in the accident, at the scene of the accident.

What is claimed is:

1. A device of the character described, comprising a body portion, means for positioning the body portion on a motor vehicle, said body portion having a plurality of spaced vertical slots extending downwardly from the upper edge thereof providing a plurality of independent identification plates, said plates being held to the body portion by weakened sections of such a nature that the plates will become readily displaced when the plates meet with an object to direct a force against said plates.

2. In a device of the character described, a body portion adapted to be secured to the upper edge of a motor vehicle bumper, said body portion having a longitudinal groove disposed intermediate the side edges thereof providing weakened portions, said body portion having slots extending from the weakened portions providing a plurality of identification plates held in position by said weakened portions of the body portion, the weakened portions being so constructed and arranged that said plates will become disconnected from the body portion by the force of an impact directed against the plates.

3. In a device of the character described, a body portion adapted to be secured to the upper edge of a motor vehicle bumper, said body portion having a plurality of spaced vertical slots providing a plurality of identification plates, said body portion having grooves formed in the inner and outer surfaces thereof, said slots extending to said grooves, said grooves providing weakened portions so constructed and arranged that said plates will become displaced from the body portion by the force of an impact directed against the plates.

JOHN E. SEBESI.